US012756245B2

(12) United States Patent

Huo et al.

(10) Patent No.: US 12,756,245 B2

(45) Date of Patent: Oct. 6, 2026

(54) ALUMINUM ALLOY WITH HIGH ELECTRICAL CONDUCTIVITY AND ELEVATED TEMPERATURE STRENGTH FOR USE IN ELECTRIC VEHICLE MOTORS

(71) Applicant: Ford Global Technologies, LLC, Dearborn, MI (US)

(72) Inventors: Yang Huo, Canton, MI (US); Mei Li, Bloomfield Hills, MI (US); Larry Alan Godlewski, Fenton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 233 days.

(21) Appl. No.: 18/787,423

(22) Filed: Jul. 29, 2024

(65) Prior Publication Data

US 2026/0031663 A1 Jan. 29, 2026

(51) Int. Cl.

*H02K 1/02* (2006.01)
*C22C 21/00* (2006.01)
*H02K 7/00* (2006.01)

(52) U.S. Cl.

CPC ............... *H02K 1/02* (2013.01); *C22C 21/00* (2013.01); *H02K 7/003* (2013.01)

(58) Field of Classification Search

CPC ........... C22C 21/00; H02K 1/02; H02K 7/003
See application file for complete search history.

(56) References Cited

U.S. PATENT DOCUMENTS 10,822,675 B2 11/2020 Sanaty-Zadeh et al.
11,421,304 B2 8/2022 Palanivel et al.
2011/0268604 A1 11/2011 Cai
2019/0127824 A1 5/2019 Palanivel et al.
2019/0161834 A1* 5/2019 Huh ........................ C22C 21/02
2020/0407826 A1* 12/2020 Byczynski ................ C22F 1/04
2021/0332461 A1 10/2021 Palanivel et al.
2022/0090234 A1 3/2022 Breton et al.
2022/0349034 A1 11/2022 Palanivel et al.
2023/0054627 A1 2/2023 Zhang et al.
2023/0067206 A1 3/2023 Wang et al.

FOREIGN PATENT DOCUMENTS

CN 102268578 12/2011
CN 103820686 5/2014
CN 108251718 7/2018
CN 109576539 4/2019
CN 110453116 11/2019

(Continued)

OTHER PUBLICATIONS

Li, et al., Al Alloys and Casting Processes for Induction Motor Applications in Battery-Powered Electric Vehicles: A Review, Metals, Jan. 24, 2022, 25 pages, vol. 12(216), MDPI, Basel, Switzerland.

*Primary Examiner* — Naishadh N Desai

(74) *Attorney, Agent, or Firm* — Burris Law, PLLC

(57) ABSTRACT

An aluminum alloy includes iron in an amount between greater than 0.9 wt. % and less than or equal to 1.5 wt. %, nickel in an amount between greater than or equal to 2.0 wt. % and less than 4.0 wt. %, titanium in an amount between 0 wt. % and less than or equal to 0.1 wt. %, incidental impurities, and a balance of aluminum. The alloy has a 150° C. yield strength between about 70-120 MPa and an electrical conductivity between about 45-53 IACS.

20 Claims, 8 Drawing Sheets

(56) References Cited

FOREIGN PATENT DOCUMENTS

| | | |
|---|---|---|
| CN | 111575557 | 8/2020 |
| CN | 111961924 | 11/2020 |
| CN | 112111668 | 12/2020 |
| CN | 112143939 | 12/2020 |
| CN | 109207759 | 3/2021 |
| CN | 112430765 | 3/2021 |
| CN | 112567059 | 3/2021 |
| CN | 115896553 | 4/2023 |
| EP | 3741877 | 11/2020 |
| EP | 3757239 | 12/2020 |
| EP | 4134460 | 2/2023 |
| WO | 2020028730 | 2/2020 |
| WO | 2020119501 | 6/2020 |
| WO | 2020150830 | 7/2020 |

* cited by examiner

Hot tearing crack

Hot tearing break

ALUMINUM ALLOY WITH HIGH ELECTRICAL CONDUCTIVITY AND ELEVATED TEMPERATURE STRENGTH FOR USE IN ELECTRIC VEHICLE MOTORS

FIELD

The present disclosure relates to aluminum alloys and particularly to cast aluminum alloys with high electrical conductivity and elevated temperature strength.

BACKGROUND

The statements in this section merely provide background information related to the present disclosure and may not constitute prior art.

High-temperature strength and high electrical conductivity are material properties that are desirable in applications such as electric motors for electric vehicles. However, certain manufacturing methods, such as conventional casting of aluminum alloys, are unable to produce such material properties. For example, although Al—Si-based die casting alloys typically have yield strengths higher than 100 MPa at 150° C., their electrical conductivities are relatively low. On the other hand, 100 series aluminum alloys have high electrical conductivity, but a low high-temperature strength (<40 MPa) and poor castability.

These challenges with materials and processing of alloys for use in motors for electric vehicles are addressed by the present disclosure.

SUMMARY

This section provides a general summary of the disclosure and is not a comprehensive disclosure of its full scope or all of its features.

In one form of the present disclosure, an aluminum alloy includes iron in an amount between greater than 0.9 wt. % and less than or equal to 1.5 wt. %, nickel in an amount between greater than or equal to 2.0 wt. % and less than 4.0 wt. %, titanium in an amount between 0 wt. % and less than or equal to 0.1 wt. %, incidental impurities, and a balance of aluminum. The aluminum alloy has a 150° C. yield strength between about 70-120 MPa and an electrical conductivity between about 45-53 IACS.

In variations of this alloy, which may be implemented individually or in any combination: the iron is between greater than 0.9 wt. % and 1.3 wt. %; the iron is between greater than 0.9 wt. % and 1.1 wt. %; the nickel is between 2.0 wt. % and 3.5 wt. %; the nickel is between 2.0 wt. % and 3.0 wt. %; the titanium is between 0.01 wt. % and 0.1 wt. %; the titanium is between 0 wt. % and 0.05 wt. %; the 150° C. yield strength is between about 70-100 MPa; the iron is 1.1 wt. % and the nickel is 2.5 wt. %.

In another form of the present disclosure, a rotor for use in an electric motor is cast from an aluminum alloy. The aluminum alloy consists of iron in an amount between greater than 0.9 wt. % and less than or equal to 1.5 wt. %, nickel in an amount between greater than or equal to 2.0 wt. % and less than 4.0 wt. %, titanium in an amount between 0 wt. % and less than or equal to 0.1 wt. %, incidental impurities, and a balance of aluminum. The alloy has a 150° C. yield strength between about 70-120 MPa and an electrical conductivity between about 45-53 IACS.

In variations of this rotor, which may be implemented individually or in any combination; the iron is between greater than 0.9 wt. % and 1.3 wt. %; the nickel is between 2.0 wt. % and 3.5 wt. %; the nickel is between 2.0 wt. % and 3.0 wt. %; the titanium is between 0.01 wt. % and 0.1 wt. %; the iron is 1.1 wt. %; and the nickel content is 2.5 wt. %.

In yet another form of the present disclosure, an electric motor includes a housing, a stator mounted within the housing, a shaft extending through the center of the stator, and a rotor mounted on the shaft. The rotor is cast from an aluminum alloy. The aluminum alloy consists of iron in an amount between greater than 0.9 wt. % and less than or equal to 1.5 wt. %, nickel in an amount between greater than or equal to 2.0 wt. % and less than 4.0 wt. %, titanium in an amount between 0 wt. % and less than or equal to 0.1 wt. %, incidental impurities, and a balance of aluminum. The alloy has a 150° C. yield strength between about 70-120 MPa and an electrical conductivity between about 45-53 IACS.

In variations of this electric motor, which may be implemented individually or in any combination; the iron is between greater than 0.9 wt. % and 1.3 wt. %; the nickel is between 2.0 wt. % and 3.0 wt. %; the titanium is between 0.01 wt. % and 0.1 wt. %; the iron is 1.1 wt. % and the nickel is 2.5 wt. %.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5A:
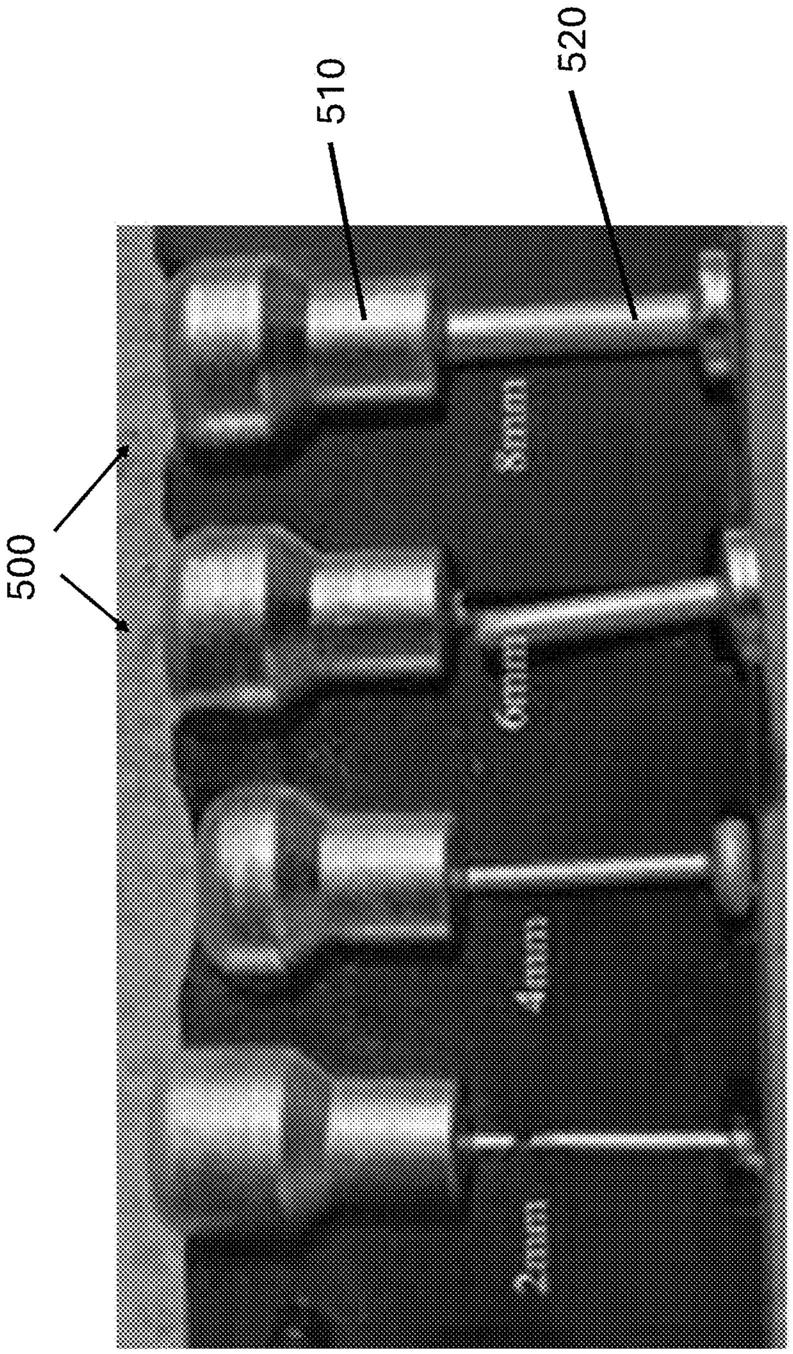
FIG. 5A is an image of typical dumbbell shaped casting molds used for testing for hot tearing.
Figure 5B:
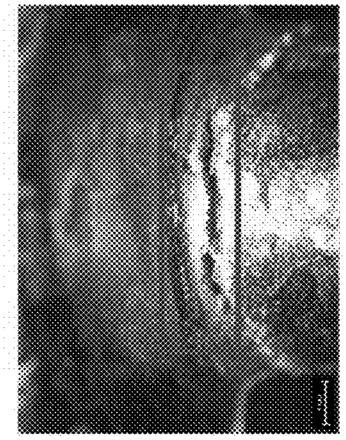
FIG. 5B is an image of a typical hot tearing crack.
Figure 5C:
Figure 6:
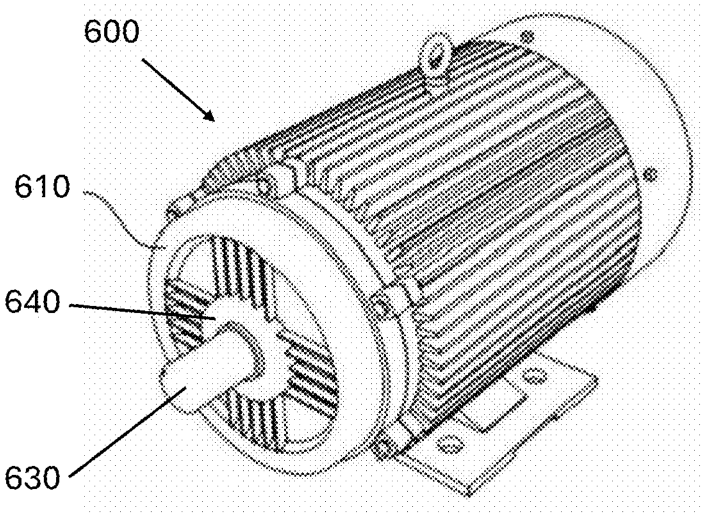
Figure 7:
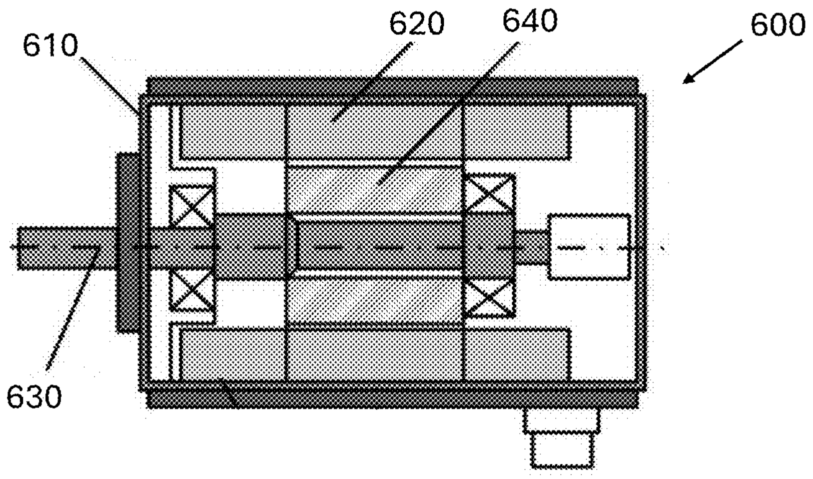

FIG. 5C an image of a typical hot tearing break;

FIG. 6 is a perspective view of an electric motor employing the aluminum alloy according to the teachings of the present disclosure; and FIG. 7 is a cross-sectional view of the electric motor of FIG. 6 according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Aluminum is a material with good electrical conductivity properties which can be easily cast for use in numerous applications. However, it can lack appropriate strength at high temperatures in certain applications. The present disclosure provides a novel cast aluminum alloy with both high strength at elevated temperatures and high electrical conductivity.

The aluminum alloy according to the present disclosure includes iron (Fe) and nickel (Ni). In one form, the aluminum alloy also includes titanium (Ti). More specifically, the aluminum alloy consists of iron in an amount between greater than 0.9 wt. % and less than or equal to 1.5 wt. %, nickel in an amount between greater than or equal to 2.0 wt. % and less than 4.0 wt. %, and titanium in an amount between 0 wt. % and less than or equal to 0.1 wt. %. In one particular form, the iron is 1.1 wt. % and the nickel is 2.5 wt. %.

The iron in the aluminum alloy serves to enhance strength at both room and elevated temperatures. Further, by forming eutectics with aluminum, hot-tearing and die-soldering susceptibility may be reduced, which may result in better castability. However, too much iron decreases the electrical conductivity and castability of the alloy. Therefore, the iron is in an amount greater than 0.9 wt. % and less than or equal to 1.5 wt. % to balance the desired mechanical properties, namely, high electrical conductivity and high strength at elevated temperatures. In another form, the iron is between greater than 0.9 wt. % and 1.3 wt. %. In one particular form, the iron is 1.1 wt. %.

Nickel is added to the aluminum alloy to enhance strength at both room and elevated temperatures. Nickel also forms eutectics with aluminum, which may result in better castability of the alloy. However, too much nickel decreases the electrical conductivity of the alloy. An amount of nickel between greater than or equal to 2.0 wt. % and less than 4.0 wt. % was found by the inventors to result in an advantageous combination of high strength at elevated temperatures and high electrical conductivity. In another form, the nickel is between 2.0 wt. % and 3.0 wt. %. In one particular form, the nickel is 2.5 wt. %.

Optionally, the aluminum alloy also includes titanium. Titanium refines the grain boundaries of aluminum, which has a positive effect on the strength of the aluminum alloy at elevated temperatures. The titanium is in an amount between 0 wt. % and less than or equal to 0.1 wt. %. In another form, the titanium is between 0.01 wt. % and 0.1 wt. %.

Some small amounts of impurities are incidental to any alloying process. However, the alloy according to the present disclosure does not include intentional additions of other elements other than those set forth above. In particular, the aluminum alloy does not include more than unintentional impurities of Si, Mg, Cr, Sr, Mn, Zr, V, which contribute negatively to the desired high electrical conductivity.

Figure 1A:
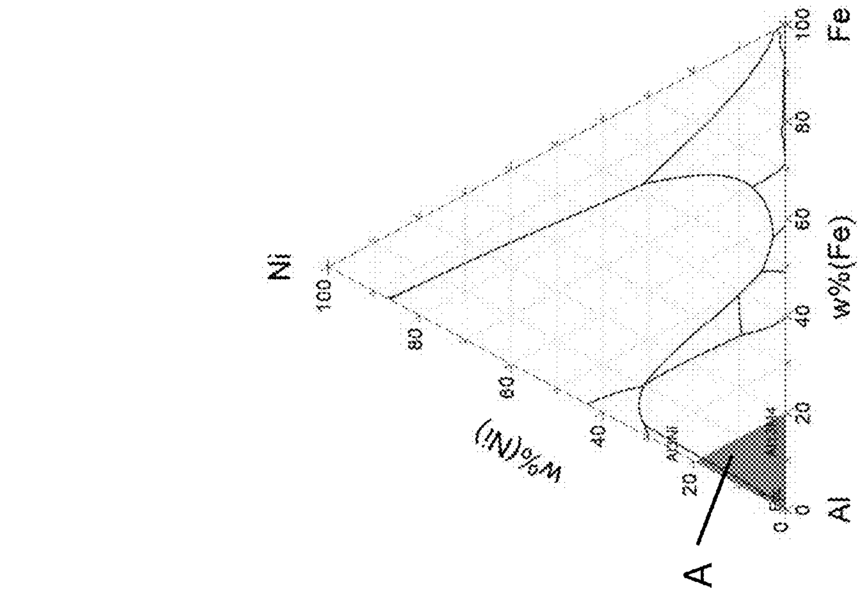
FIG. 1A is a ternary phase diagram for an alloy of aluminum, iron, and nickel (Al—Fe—Ni) according to the teachings of the present disclosure.
Figure 1B:
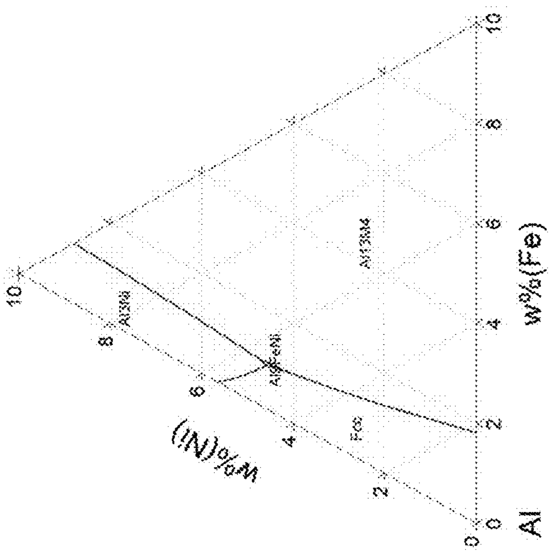
FIG. 1B is an enlarged view within detail A of the ternary phase diagram of FIG. 1A.

Turning now to FIGS. 1A and 1B, a ternary phase diagram for an alloy of aluminum, iron, and nickel (i.e., an Al—Fe—Ni alloy) is shown, with FIG. 1B showing an enlarged view of the lower left portion of FIG. 1A, corresponding to nickel and iron ranges less than 10 wt. % with a balance of aluminum. The Al—Fe—Ni alloy forms a ternary eutectic system, where an invariant eutectic reaction occurs for Al0.9 wt % Fe4.6 wt % Ni at 645° C. The reaction is between face centered cubic (FCC) aluminum, Al3Ni, and Al9FeNi. Near-eutectic compositions are generally good candidates for casting processes because the eutectic phase formed after the formation of Al dendrites aids in reducing susceptibility to hot-tearing.

Figure 2A:
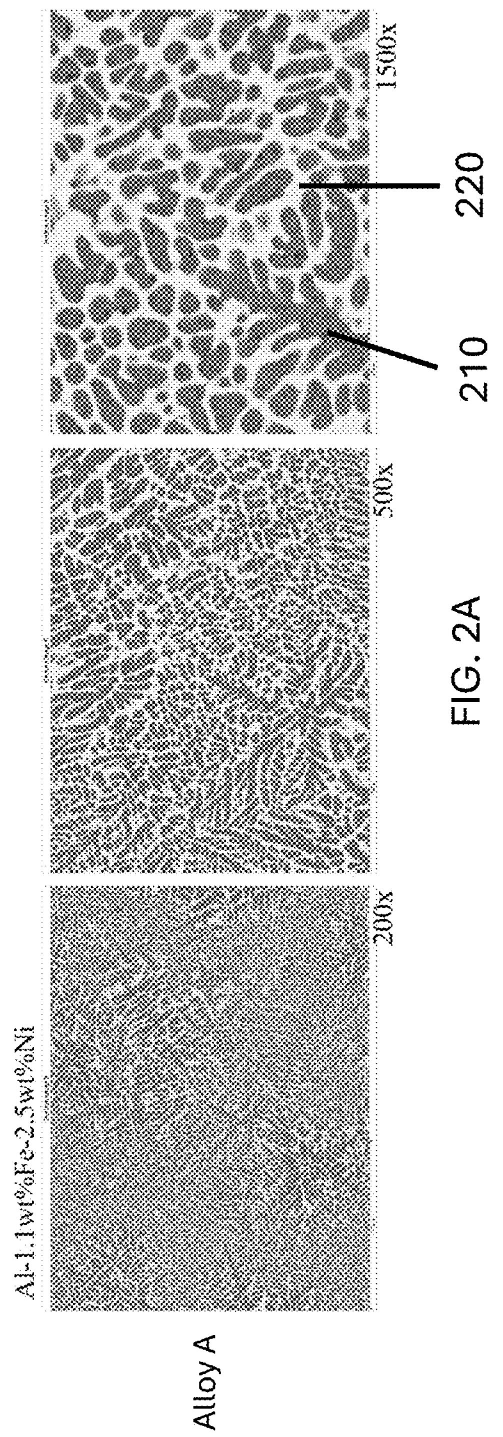
FIG. 2A is a microstructure for an alloy of aluminum, iron, and nickel (Al—Fe—Ni), at varying magnifications, according to the teachings of the present disclosure.
Figure 2B:
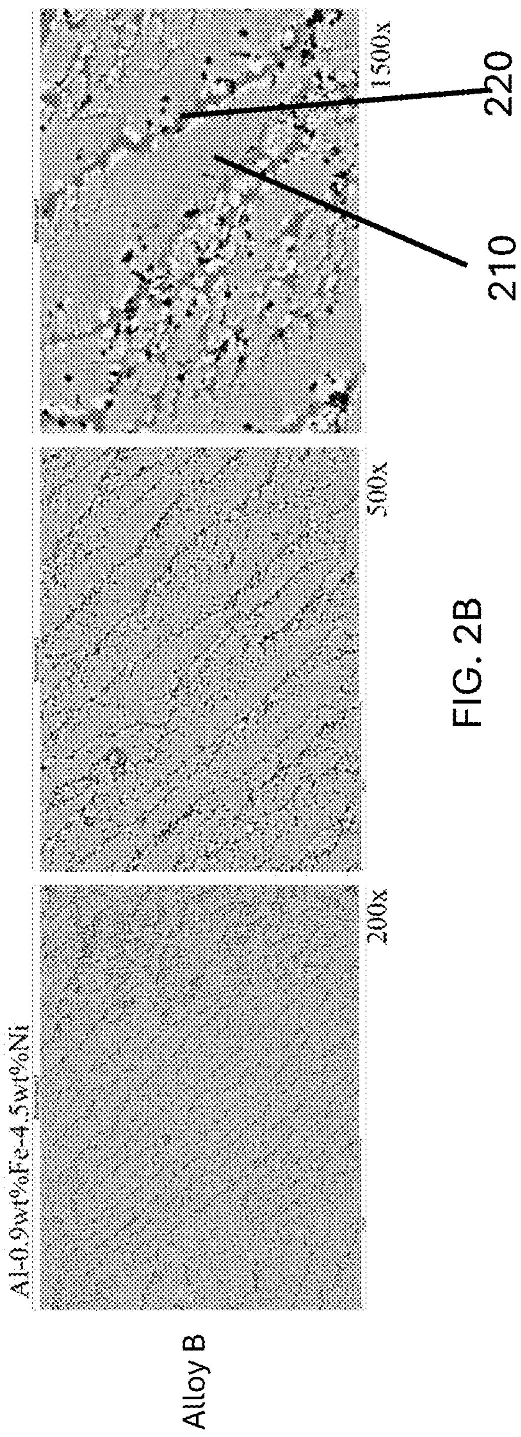
FIG. 2B is a microstructure for an alloy of aluminum, iron, and nickel (Al—Fe—Ni), at varying magnifications, according to the teachings of the present disclosure.

Referring to FIGS. 2A and 2B, microstructures of two inventive Al—Fe—Ni cast alloys according to the teachings of the present disclosure are shown, namely, Alloy A and Alloy B as shown below in Table 1.

TABLE 1

| Inventive Alloy | Aluminum (wt. %) | Iron (wt. %) | Nickel (wt. %) |
|---|---|---|---|
| Alloy A | Balance | 1.1 | 2.5 |
| Alloy B | Balance | 0.9 | 4.5 |

As shown in FIG. 2A, aluminum dendrites 210 and ternary eutectics 220 are present in the Alloy A microstructure. As the composition moves toward the eutectic point, the dendrites 210 decrease and more ternary eutectics 220 are present as shown by the Alloy B microstructure in FIG. 2B, which has less iron and greater nickel than Alloy A. For an alloy with 9 wt. % iron and 4.6 wt. % nickel, a nearly full eutectic microstructure is obtained at 645° C. The dentrites provide mechanical properties and the presence of eutectics corresponds to increased strength at high temperatures. A microstructure containing both fine dendrites and eutectics in the microstructure produces a balanced range of properties.

Experimental testing was conducted on the two compositions according to the present disclosure, namely, Alloy A and Alloy B. Results of the testing, which include mechanical and electrical properties as shown, are shown below in Table 2.

TABLE 2

| Alloy | Yield Strength at 150° C. (MPa) | Ultimate Tensile Strength at 150° C. (MPa) | Elongation at 150° C. (%) | Electrical Conductivity (IACS) |
|---|---|---|---|---|
| Alloy A | 75.2 ± 5.4 | 132.0 ± 4.0 | 27.3 ± 8.4 | 50-52.2 |
| Alloy B | 120.8 ± 7.8 | 188.8 ± 14.7 | 10.0 ± 2.9 | 44-45 |

As shown, the inventive alloys can achieve a yield strength greater than 70 MPa at temperatures up to 150° C. Alloy A has a yield strength of 69.8-80.6 MPa and Alloy B has a yield strength of 113.0-128.6 MPa. Further, Alloy A has an ultimate tensile strength of 132.0±4.0 MPA and an elongation of 27.3±8.4%. Alloy B has an ultimate tensile strength of 188.8±14.7 MPA and an elongation of 10.0±2.9% Without being bound to any specific theory, experimental results indicate that alloying of iron and nickel into aluminum improves strength at both room and elevated temperatures by forming thermally stable eutectic phases.

The electrical conductivity of the two inventive aluminum alloys according to this preliminary testing ranged from 44 to 52.2 IACS (International Annealed Copper Standard). The electrical conductivity can be seen to decrease as the nickel content increases from 2.5 to 4.5 wt. %. Without being bound to any specific theory, experimental results indicate that alloying of higher amounts of iron and nickel into aluminum decreases the electrical conductivity of the alloy. Thus, the ranges of iron and nickel content are critical to balancing the strength and electrical conductivity properties.

Figure 3:
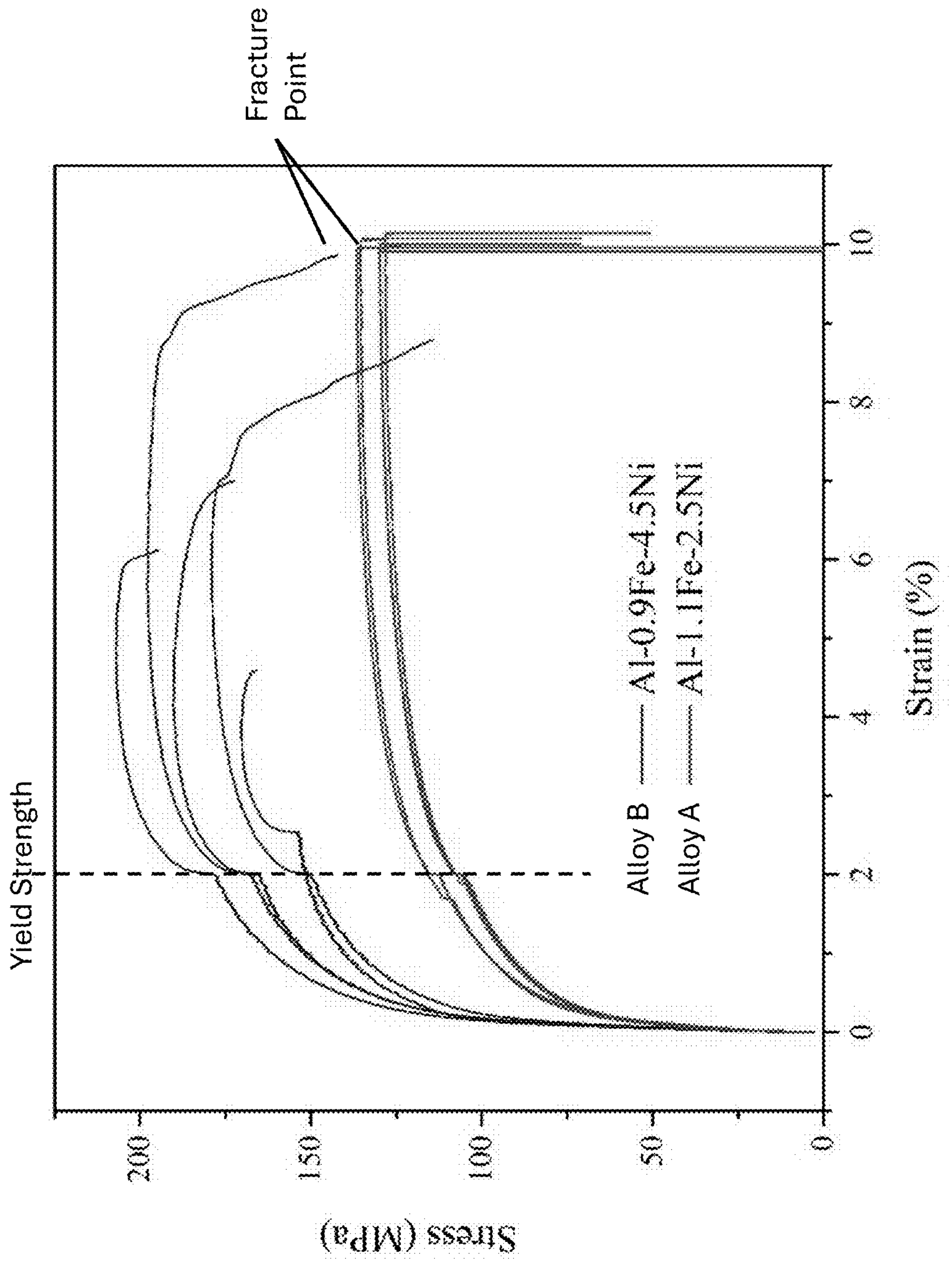
FIG. 3 is a chart showing stress-strain curves measured at 150° C. for two Al—Fe—Ni alloys according to the teachings of the present disclosure.

Referring to FIG. 3, stress-strain curves measured at 150° C. for the two inventive alloys, namely, Alloy A and Alloy B are shown. The curves represent the relationship between stress and strain under deformation. The shape of the curves indicate that Alloy B has a higher yield strength; however, Alloy A can withstand more strain prior to fracture.

In addition to having sufficient strength and electrical properties, the aluminum alloys of the present disclosure are also castable. One measure of castability is susceptibility to hot-tearing, a type of casting imperfection. Hot tearing imperfections occur within a critical temperature range when between 80% and 100% of the cast material is in a solid phase, that is, the fraction of solid of the alloy during casting is between 0.8 and 1.0. In this range, the material exhibits reduced ductility and there are no channels remaining within the dendritic structure to allow in-filling flow to occur. As a result, the metal can crack or split, leading to the formation of hot tears during the casting process. Alloys with narrower temperature changes as the fraction of solid moves from 80% to 100% thus have less possibility of forming hot tearing imperfections. The hot-tearing susceptibility of near-eutectic compositions for the inventive alloys were assessed by both computational and experimental methods.

Computational Analysis/Data

Figure 4:
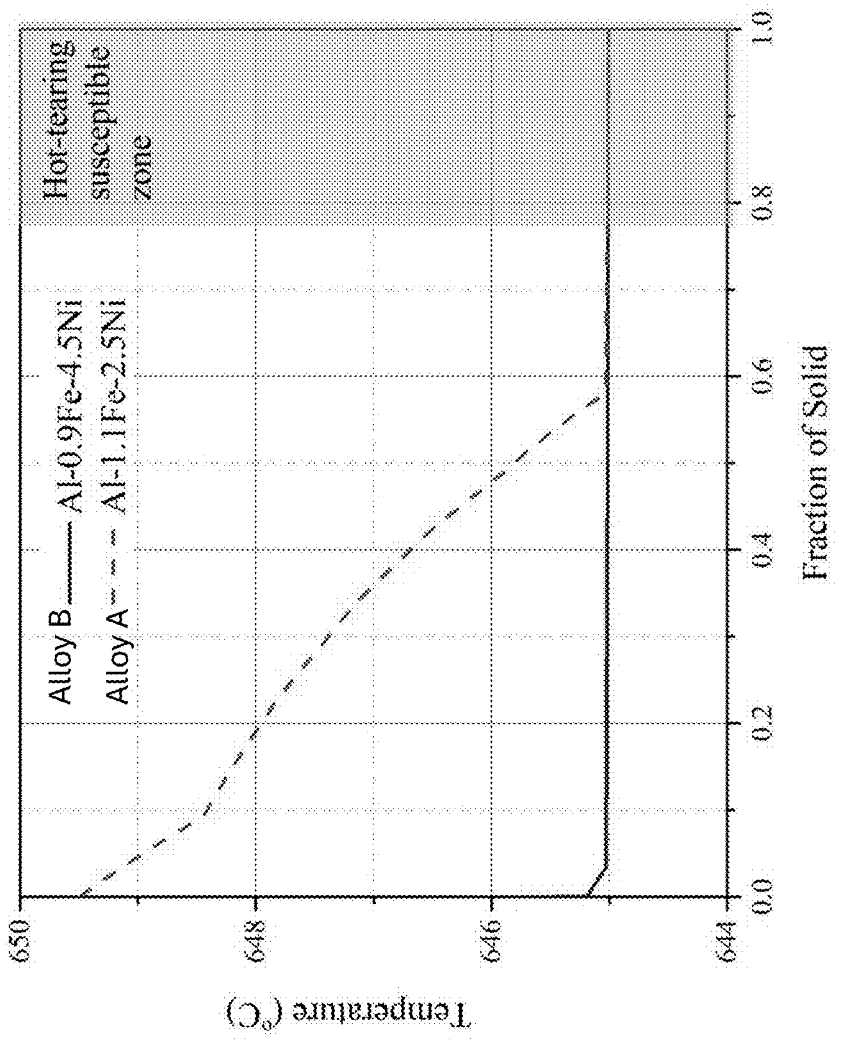
FIG. 4 is a chart showing fraction of solid as a function of temperature based on simulated thermodynamic data for two Al—Fe—Ni alloys according to the teachings of the present disclosure.

The fraction of solid as a function of temperature for Alloy A and Alloy B were calculated by thermodynamic simulation. The results of the simulation are shown in FIG. 4. The temperature change in both Alloy A and Alloy B is negligible between 80% and 100% (0.8 and 1.0 in FIG. 4) fraction of solid. Because these alloys have small temperature changes between 80% and 100% fraction of solid, the inventive alloys are resistant to the formation of hot tearing imperfections during a casting process.

Experimental Data

Referring to FIGS. 5A, 5B and 5C, evaluation of the formation of hot tearing imperfections is typically conducted using dumbbell shaped casting molds 500. As shown in FIG. 5A, each dumbbell shaped casting mold 500 has a wider end 510 and a connecting rod 520 with a smaller diameter. A range of casting molds with connecting rods 520 of different diameters are cast from a particular alloy. During the casting process, the two-ended structure of the dumbbell shape creates hot spots, particularly where the connecting rod 520 meets the wider end 510. These hot spots may initiate the formation of hot tearing imperfections, including hot tearing cracks and even hot tearing breaks. Hot tearing breaks are increasingly likely as the diameter 530 of the connecting rod 520 increases. FIG. 5B depicts a hot tearing crack, while FIG. 5C shows a hot tearing break.

Hot tearing testing with dumbbell shaped casting molds was conducted on samples of the aluminum alloys listed below in Table 3.

TABLE 3

| Composition | 8 mm diameter | | | 6 mm diameter | | | 4 mm diameter | | |
|---|---|---|---|---|---|---|---|---|---|
| | Crack | Break | Total | Crack | Break | Total | Crack | Break | Total |
| Prior Art Alloy (Al—7Si—2.5Mg) | N/A | 5 | 5 | N/A | 5 | 5 | 5 | 5 | 5 |
| Alloy A (Al—1.1 wt % Fe—2.5 wt % Ni) | 0 | 0 | 6 | 4 | 0 | 6 | 3 | 0 | 5 |
| Alloy B (Al—0.9 wt % Fe—4.5 wt % Ni) | 0 | 0 | 7 | 3 | 0 | 10 | 3 | 0 | 10 |
| Alloy C (Al—1.6Fe—2.5Ni) | 4 | 0 | 7 | 3 | 2 | 5 | 0 | 6 | 6 |

The alloys tested include a prior art alloy containing silicon and magnesium (Al-7Si-2.5 Mg) commonly used in cast aluminum applications, inventive alloys Alloy A and Alloy B discussed above, and comparative Alloy C. Alloy C contains 1.6 wt. % iron, 2.5 wt. % nickel, and a balance of aluminum. For each of these alloys, a set of dumbbell shaped casting molds 500 were cast having connecting rods of specific diameters (8 mm, 6 mm, and 4 mm). After casting, the total number of tested molds showing cracks and breaks were counted for each of the alloys and for each different diameter. The results are summarized in Table 3.

As Table 3 shows, the prior art Al7Si2.5MgMn alloy shows poor hot-tearing resistance. Hot tearing breaks were observed in the samples with diameters of 8 mm. For inventive Alloy A and Alloy B, hot tearing cracks were only observed in limited samples with diameters of 6 mm and 4 mm, while no hot-tearing imperfections were observed with diameters larger than or equal to 8 mm. However, when the Fe content increases above 1.6 wt. % in Alloy C, hot-tearing breaks were observed, indicating reduced hot tearing performance.

Referring now to FIGS. 6 and 7, according to one aspect of the present disclosure, the inventive aluminum alloys described herein are used in an electric motor application. It should be understood that the inventive aluminum alloys may be employed in other applications with similar mechanical and electrical property requirements, and thus the electric motor application should not be construed as limiting the application of the present disclosure. The electric motor 600 as shown includes a housing 610, a stator 620 mounted within the housing 610, a shaft 630 extending through the center of the stator 620, and a rotor 640 mounted on the shaft 630. In this application, the rotor 640 is cast from one of the aluminum alloys of the present disclosure. The rotor must conduct electricity while being strong enough to withstand operational stresses, which the inventive alloys provide.

It should also be understood that the elemental ranges discussed herein include all incremental values between the minimum alloying element composition and maximum alloying element composition values. That is, a minimum alloying element composition value can range from the minimum value to the maximum value. Likewise, the maximum alloying element composition value can range from the maximum value shown to the minimum value discussed. For example, the minimum nickel content can be 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9 and any value between these incremental values, and the maximum nickel content can be 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1 and any value between these incremental values.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aluminum alloy consisting of:
- iron in an amount between greater than 0.9 wt. % and less than or equal to 1.5 wt. %;
- nickel in an amount between greater than or equal to 2.0 wt. % and less than 4.0 wt. %;
- titanium in an amount between 0 wt. % and less than or equal to 0.1 wt. %;
- incidental impurities; and
- a balance of aluminum,
- the alloy having a 150° C. yield strength between about 70-120 MPa and an electrical conductivity between about 45-53 IACS.

2. The aluminum alloy of claim 1, wherein the iron is between greater than 0.9 wt. % and 1.3 wt. %.

3. The aluminum alloy of claim 1, wherein the iron is between greater than 0.9 wt. % and 1.1 wt. %.

4. The aluminum alloy of claim 1, wherein the nickel is between 2.0 wt. % and 3.5 wt. %.

5. The aluminum alloy of claim 1, wherein the nickel is between 2.0 wt. % and 3.0 wt. %.

6. The aluminum alloy of claim 1, wherein the titanium is between 0.01 wt. % and 0.1 wt. %.

7. The aluminum alloy of claim 1, wherein the titanium is between 0 wt. % and 0.05 wt. %.

8. The aluminum alloy of claim 1, wherein the 150° C. yield strength is between about 70-100 MPa.

9. The aluminum alloy of claim 1, wherein the iron is 1.1 wt. % and the nickel is 2.5 wt. %.

10. A rotor for use in an electric motor, the rotor being cast from an aluminum alloy, the aluminum alloy consisting of:
- iron in an amount between greater than 0.9 wt. % and less than or equal to 1.5 wt. %;
- nickel in an amount between greater than or equal to 2.0 wt. % and less than 4.0 wt. %;
- titanium in an amount between 0 wt. % and less than or equal to 0.1 wt. %;
- incidental impurities; and
- a balance of aluminum,
- the alloy having a 150° C. yield strength between about 70-120 MPa and an electrical conductivity between about 45-53 IACS.

11. The rotor of claim 10, wherein the iron is between greater than 0.9 wt. % and 1.3 wt. %.

12. The rotor of claim 10, wherein the nickel is between 2.0 wt. % and 3.5 wt. %.

13. The rotor of claim 10, wherein the nickel is between 2.0 wt. % and 3.0 wt. %.

14. The rotor of claim 10, wherein the titanium is between 0.01 wt. % and 0.1 wt. %.

15. The rotor of claim 10, wherein the iron is 1.1 wt. % and the nickel content is 2.5 wt. %.

16. An electric motor comprising:
- a housing;
- a stator mounted within the housing;
- a shaft extending through the center of the stator; and
- a rotor mounted on the shaft, the rotor being cast from an aluminum alloy, the aluminum alloy consisting of:
- iron in an amount between greater than 0.9 wt. % and less than or equal to 1.5 wt. %;
- nickel in an amount between greater than or equal to 2.0 wt. % and less than 4.0 wt. %;
- titanium in an amount between 0 wt. % and less than or equal to 0.1 wt. %;
- incidental impurities; and
- a balance of aluminum,
- the alloy having a 150° C. yield strength between about 70-120 MPa and an electrical conductivity between about 45-53 IACS.

17. The electric motor of claim 16, wherein the iron is between greater than 0.9 wt. % and 1.3 wt. %.

18. The electric motor of claim 16, wherein the nickel is between 2.0 wt. % and 3.0 wt. %.

19. The electric motor of claim 16, wherein the titanium is between 0.01 wt. % and 0.1 wt. %.

20. The electric motor of claim 16, wherein the iron is 1.1 wt. % and the nickel is 2.5 wt. %.

* * * * *